United States Patent [19]

Busse

[11] 4,127,353
[45] Nov. 28, 1978

[54] DETACHABLE CONNECTOR FOR CABINETS

[75] Inventor: Peter Busse, Vlotho, Germany

[73] Assignee: Firma Richard Heinze, Germany

[21] Appl. No.: 800,316

[22] Filed: May 25, 1977

[30] Foreign Application Priority Data

Jun. 4, 1976 [DE] Fed. Rep. of Germany ....... 2625180
Jan. 22, 1977 [DE] Fed. Rep. of Germany ....... 2702643

[51] Int. Cl.$^2$ ............................................. F16B 12/34
[52] U.S. Cl. ..................................... 403/245; 52/285; 312/264; 403/407
[58] Field of Search ............... 403/405, 406, 407, 409, 403/187, 192, 195, 230, 245; 52/285; 108/111; 312/264

[56] References Cited

U.S. PATENT DOCUMENTS

| 1,432,349 | 10/1922 | McFarland | 403/407 |
|---|---|---|---|
| 1,537,459 | 5/1925 | Campbell | 403/407 |
| 2,129,432 | 9/1938 | Lipp | 403/187 |
| 3,159,440 | 12/1964 | Courtwright | 52/285 X |
| 3,365,224 | 1/1968 | Thome | 52/285 X |
| 3,596,942 | 8/1971 | Zoebelein | 403/407 |
| 3,645,162 | 2/1972 | Welch | 52/285 |
| 3,730,568 | 5/1973 | Giovannetti | 403/245 |
| 4,047,822 | 9/1977 | Lehmann | 403/245 X |

Primary Examiner—Price C. Faw, Jr.
Assistant Examiner—Conrad L. Berman
Attorney, Agent, or Firm—Jacobs & Jacobs

[57] ABSTRACT

This invention relates to a fitting for the detachable connecting of two structural parts which abut perpendicularly to each other, particularly cabinet parts, having a preferably cylindrical or partially cylindrical holding piece which can be inserted into a recess, open towards one surface side, in a first structural part, and having a connecting piece which can be anchored in a recess of the second structural part as well as on the holding piece. The connecting piece in the second structural part can be anchored relative to the connecting piece by displacement of the holding piece.

21 Claims, 28 Drawing Figures

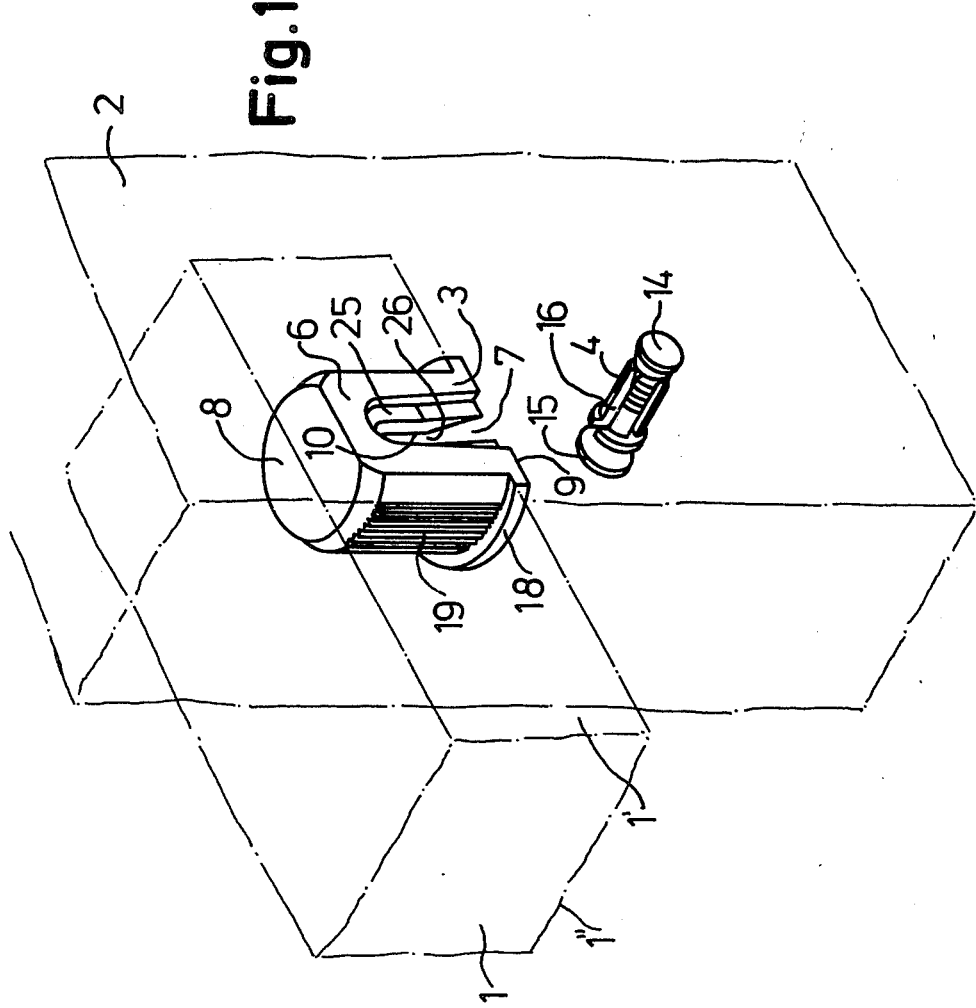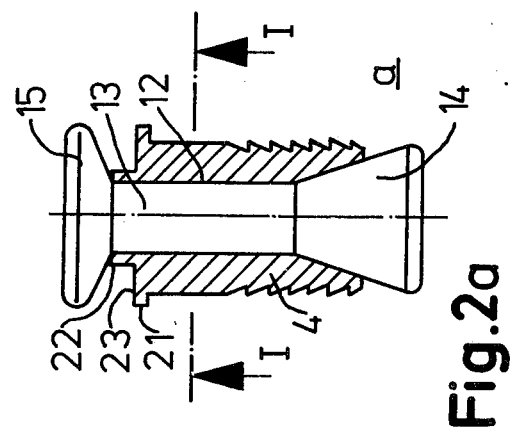

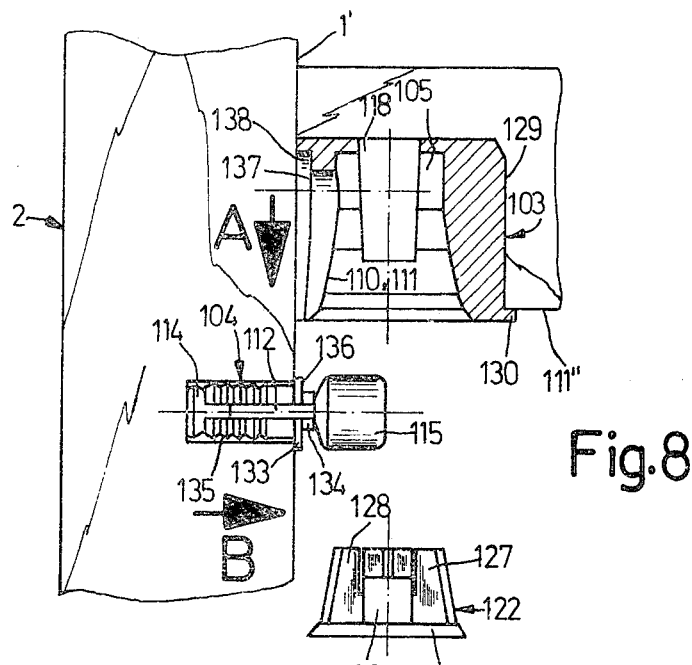
Fig. 8
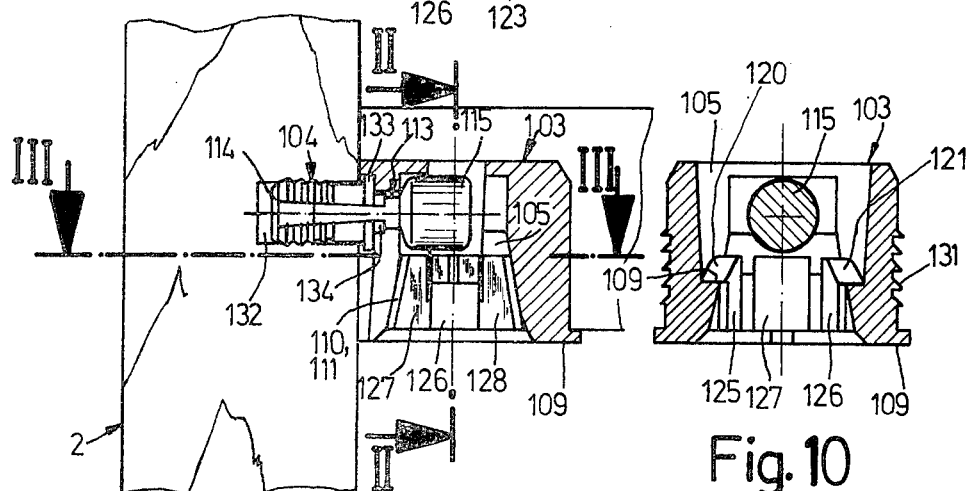
Fig. 9
Fig. 10 (II-II)
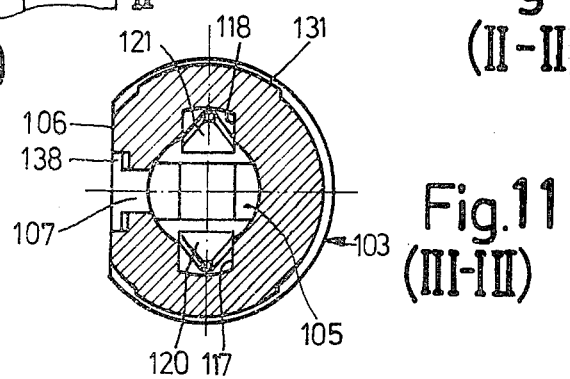
Fig. 11 (III-III)

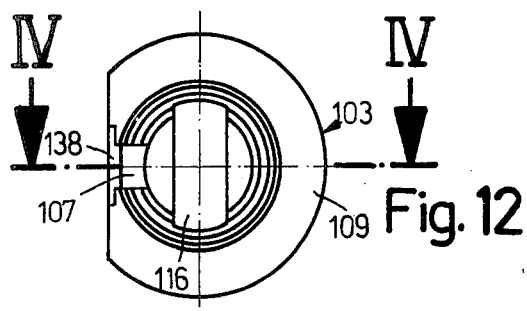
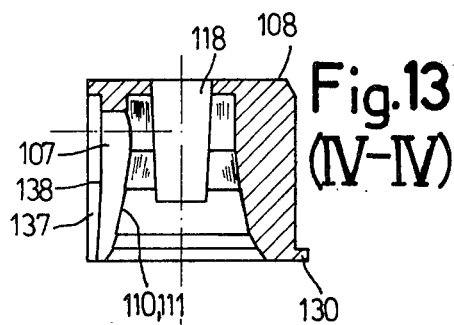
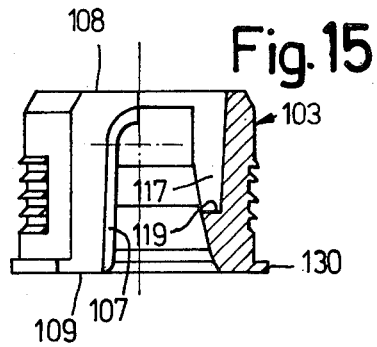
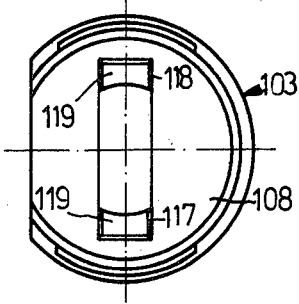
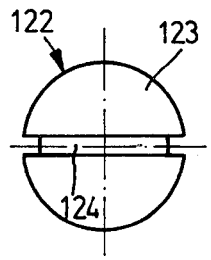
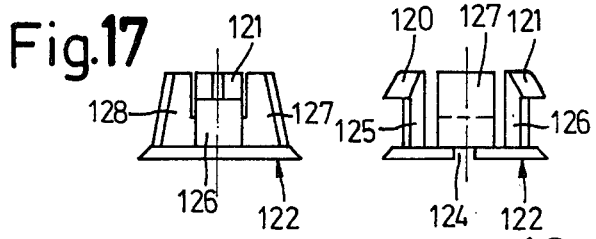
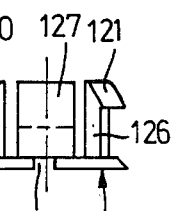
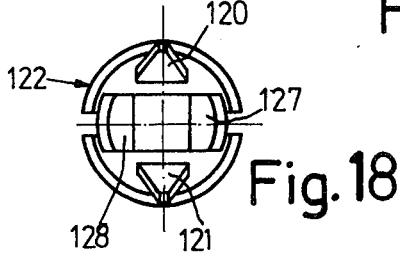

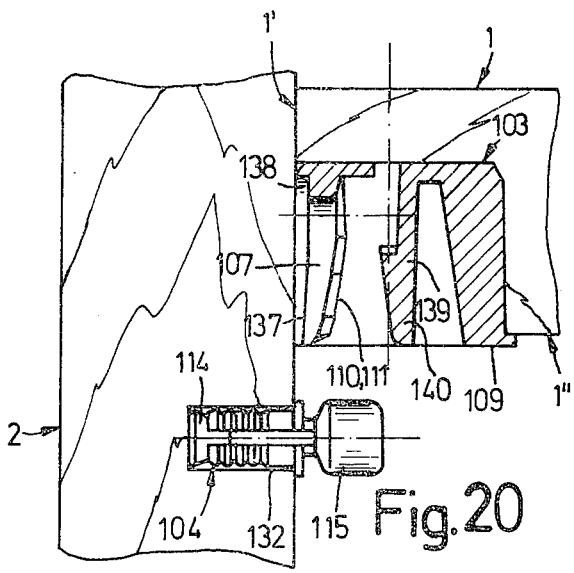
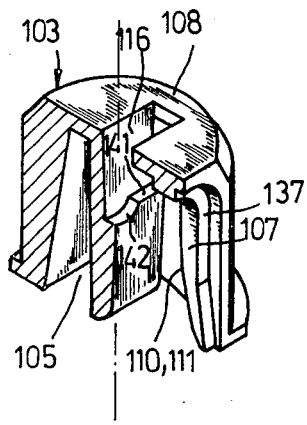
Fig.24
Fig.20
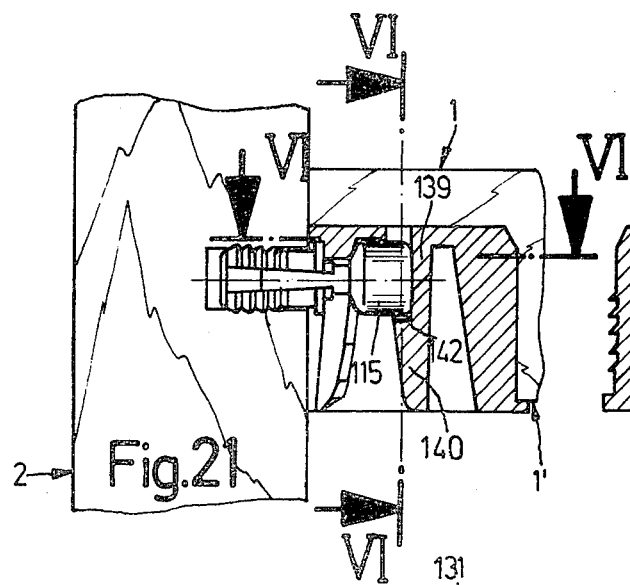
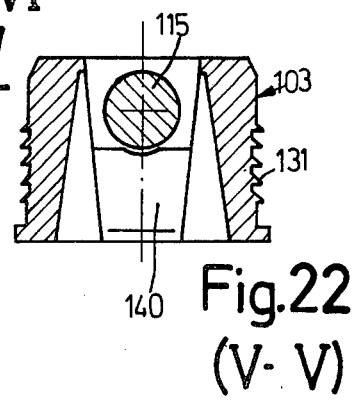
Fig.21
Fig.22
(V-V)
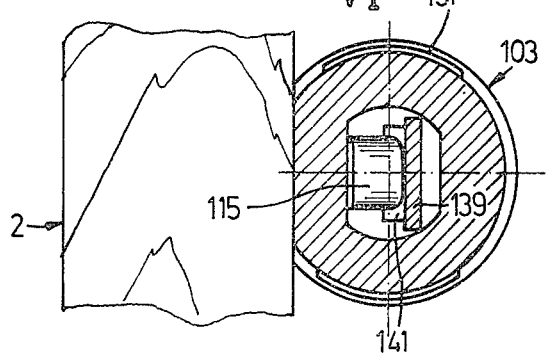
Fig.23
(VI-VI)

DETACHABLE CONNECTOR FOR CABINETS

This invention relates to a fitting for the detachable connecting of two structural parts which abut perpendicularly to each other, and particularly of two flat cabinet parts, having a preferably cylindrical or partially cylindrical holding piece which can be inserted in a recess, open towards one surface side, in a first structural part, and having a connecting piece which can be anchored in a recess of the second structural part and on the holding piece.

Fittings are increasingly being used in the furniture industry today for the connecting of furniture or cabinet parts and particularly also for the connecting of flat cabinet parts which abut perpendicularly to each other (cabinet side walls, cabinet bottoms, cabinet tops, cabinet rear walls, etc.), in order that cabinets can be delivered in knocked-down condition by the manufacturer to the final consumer in order to reduce transportation space and be assembled at the final consumer's even by untrained personnel, such fittings also permitting the cabinet parts being taken apart again, for instance in case of moving, etc.

The object of the present invention is to provide a fitting for the detachable connecting of two structural parts which abut perpendicularly to each other, which assures a simple mounting on the structural parts as well as a simple connecting of the structural parts, and in particular also makes possible a firm pressing of the structural parts against each other in connected state. In order to achieve this purpose a fitting of the aforementioned type is so developed in accordance with the invention that the connecting piece can be anchored in the second structural part by displacing the holding piece relative to the connecting piece.

In this way there is obtained a particularly simple connection between two structural parts, for instance between a cabinet bottom and a cabinet side wall, in the manner that the holding piece which, in a preferred embodiment of the invention has the shape of an expandable element, for instance the shape of an expansion dowel, is inserted in a preformed borehole in the side wall of the cabinet and the holding piece is anchored in a preformed borehole on the bottom of the cabinet, the bottom of the cabinet, by means of the holding piece which has been premounted there, being pushed over the connecting piece which protrudes slightly beyond the side wall of the cabinet and the connecting piece being anchored in the borehole of the cabinet side wall upon this displacement, for instance by expansion, so that a reliable load-bearing connection is produced between the two cabinet parts merely by the insertion of the cabinet bottom.

In addition to this simple, uncomplicated assembling of the structural parts there is a further advantage of the fitting in accordance with the invention which resides in the fact that rows of holes which are present, for instance, on the side wall of the cabinet and which are of relatively small diameter, can be directly used for the anchoring of the connecting piece. In addition to this, no special tools such as screwdrivers, special wrenches, etc., are necessary whatsoever for connecting the cabinet parts when using the fitting in accordance with the invention. The expanding of the connecting piece or of the expansion dowel which forms said connecting piece is effected by means of an expansion bolt which is provided at one end with an extension which cooperates with at least one surface on the holding piece which surface is developed as an oblique plane, so that said bolt is displaced relative to the connecting piece upon the displacement of the holding member relative to the connecting element or the expansion bolt and in this way the connecting piece is expanded.

It is furthermore advantageous to provide on the holding piece, on the side thereof facing the second structural part, a first rest surface for the connecting piece as well as a second rest surface for the second structural part, the first rest surface being at a distance from the second rest surface which becomes increasingly larger in a direction in which the holding piece is displaced so as to anchor the connecting piece in order in this way to obtain, in addition to the anchoring of the connecting piece in the second structural part, also a pressing of the two structural parts against each other or a pressing of the second structural part against the second rest surface of the holding piece.

In order to prevent an involuntary separation between the two structural parts after they have been connected together even in the event of the action of a particular force on one of the structural parts, for instance on the bottom side of the first structural part serving as cabinet bottom, cabinet top or cabinet shelf, it is furthermore advantageous to provide means which lock the holding piece, which anchors the connecting piece in the second structural part upon displacement of the holding piece from a first position into a second position, against undersired displacement relative to the connecting piece in said second position. These means consist, for instance, of an elastic detent projection, arranged within the holding piece, which engages behind the connecting element in the second position of the holding piece, or are formed of an elastic tab which extends obliquely into the inside of the holding piece, which is preferably developed in cup shape.

In a modified embodiment, it is also possible to use as means for locking the holding piece against undesired displacement relative to the connecting piece, a covering cap which after the connecting together of the structural parts, is placed over the holding piece and the inside of which is covered off from the outside and the connecting piece which extends into the inside of the holding piece is thereby so locked that relative movement between holding piece and connecting element is no longer possible.

Further developments of the fitting in accordance with the invention are described in the subordinate claims.

The invention will be described in further detail below with reference to illustrative embodiments shown in the figures, in which:

FIG. 1 shows in perspective one embodiment of a fitting in accordance with the invention together with two cabinet parts, indicated by dashed lines;

FIGS. 2a and 2b are a longitudinal section and a cross section respectively through an expansion bolt which serves as connecting piece or element;

FIG. 8 is a section through the two cabinet parts which are to be connected with each other and through the fitting of FIG. 5 before the cabinet parts have been connected to each other;

FIG. 9 is a similar view to that of FIG. 8, but after the cabinet parts have been connected to each other;

FIG. 10 is a section along the line II-II of FIG. 9;

FIG. 11 is a section along the line III-III of FIG. 9;

FIGS. 12 to 15 show the holding piece of the fitting of FIG. 5 from the front side, visible after insertion into the first structural part, seen in section along the line IV—IV, from the rear side which is not visible after insertion in the first structural part or in the first cabinet part, as well as in a side view, partially in section;

FIGS. 16 to 19 show the cover cap from the front side visible after the attachment of the structural parts or cabinet parts, in side view, and from the rear side which, after the fastening of the structural parts, extends into their side of the holding piece, and in a position turned 90° from the position shown in FIG. 17 around the axis of symmetry of the cover cap;

FIG. 20 is a section through the two cabinet parts of structural parts which are to be connected with each other and through another embodiment of the fitting in accordance with the invention, before the cabinet parts have been connected together.

FIG. 21 is a similar showing to FIG. 20, but after the two cabinet parts have been connected together;

FIG. 22 is a section along the line V—V of FIG. 21;

FIG. 23 is a section along the line VI—VI of FIG. 21;

FIG. 24 shows in perspective the holding piece of the fitting of FIG. 20, in section;

Figure 4:
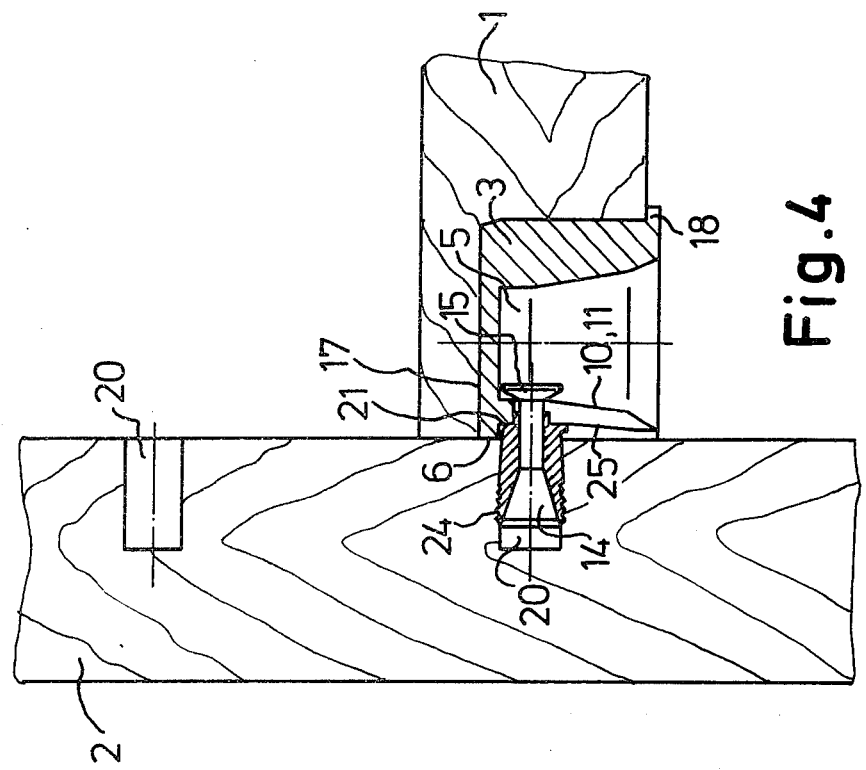
FIG. 4 is a showing similar to FIG. 3, but after the cabinet parts have been connected together.

In the FIGS., 1 and 2 are two flat cabinet parts, for instance a cabinet bottom, a cabinet top, a cabinet shelf, or a cabinet side wall which are to be connected with each other in such a manner that the front surface 1' of the cabinet part 1 rests against a surface side of the cabinet part 2 so that the cabinet parts 1 and 2 when connected to each other extend at right angles to each other. The connection is effected by a fitting which consists of a holding piece 3 and of the expansion dowel 4 which serves as connecting piece.

The holding piece 3 is of cup shape with an inner recess 5 and has a partially cylindrical circumferential surface which has a flattened region 6 serving as resting surface by which the holding piece 3 rests against a surface side of the cabinet part 2 when the cabinet parts 1 and 2 are fastened together. In this flattened region 6 there is provided in the wall of the holding piece a slot 7 which passes through said wall and extends in direction perpendicular to the surface sides of the cabinet part 1 and in direction of the axis of symmetry 5 of the holding piece 3, the slot being open towards the front side 9 facing away from the bottom surface 8 of the cup-shaped holding piece 3 and its edge surfaces 10 and 11 forming oblique planes in the recess 5 of the holding piece 3, the distance of the surfaces 10 and 11 from the outer surface of the holding piece 3 and from the flattened region 6 of the front side 9 respectively continuously increasing towards the bottom surface 8.

The expansion dowel 4 has a longitudinal borehole 12 in which an expansion bolt 13 is displaceably arranged, the bolt having an expansion cone 14 at one end and a head 15 of increased cross section at the other end. In order to introduce the expansion bolt 13 into the longitudinal bore 12 the expansion dowel 4 is furthermore provided with a slot 16 which is open towards the outer periphery of the expansion dowel 4 and furthermore extends into the longitudinal bore 12 so that the expansion bolt 13 can be introduced through this slot 16 from the side into the longitudinal bore 12 by a certain deformation of the expansion dowel, which is made of elastic material, for instance of elastic plastic.

The fastening of the two cabinet parts 1 and 2 by the fitting shown is effected in the manner that the holding piece 3 is introduced, with its bottom surface 8 towards the front, into a borehole 17 on the bottom side 1" of the cabinet part 1, this borehole being adapted in its shape to the cross section of the holding piece 3 and being open towards the front surface 1' so that the flattened region 6 remains visible at the front surface 1' and is aligned with said front surface. In order to limit the insertion of the holding piece 3 into the borehole 17 and furthermore to be able to transfer the forces reliably from the cabinet part 1 to the holding piece 3, a laterally protruding edge 18 is formed on the front side 9 which is visible after the insertion of the holding piece 3 into the bore 17, said edge resting against the bottom side 1" of the cabinet part 1. The holding piece 3 is fastened, for instance, by a clamping or frictional seat in the bore 17 and in order to prevent its twisting bears on its outer circumference longitudinal ribs 19 which dig themselves into the material of the cabinet part 1. The expansion dowel 4 is inserted, with the expansion cone 14 towards the front, into a bore 20 on the one surface side of the cabinet part 2, the bore 20, as well as the bore 17, being developed as blind holes i.e., not passing completely through. The depth of penetration of the expansion dowel 4 into the bore 20 is determined by a laterally protruding edge 21 which is developed on the end of the expansion dowel 4 facing the head 15 and rests against the surface side of the cabinet part 2.

The expansion dowel 4 furthermore has a section 22 of reduced cross section which extends to the head 15 from the front surface 23 provided with the edge 21 and sees to it that said head 15, when the expansion dowel 4 has been introduced into the bore 20, is at a sufficient distance from the surface side of the cabinet part 2 or from the end surface 23. Furthermore, the section 22, as well as the edge 21, serves at the same time also as resting surface for the holding piece, as will be described in further detail below.

Figure 3:
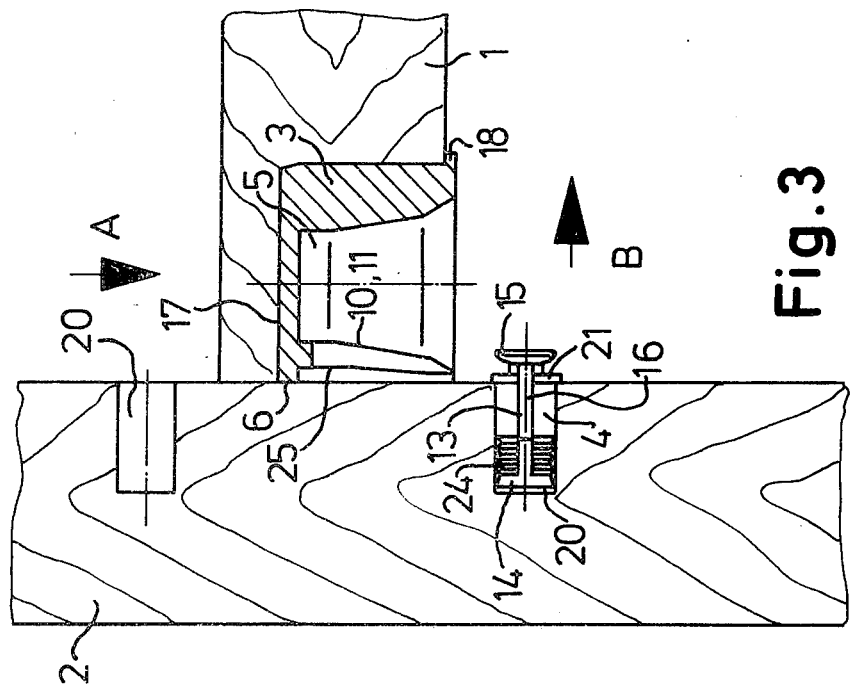
FIG. 3 is a section through the two cabinet parts and through the fitting shown in FIG. 1, before the cabinet parts have been connected together.

If the holding piece 3 as well as the expansion dowel 4 is arranged in the boreholes 17 and 20 respectively, the cabinet parts are placed first of all against each other, for connection, in the manner shown in FIG. 3, the front surface 1' of the cabinet part 1 resting against the surface side of the cabinet part 2 which is provided with the bore 20. The cabinet part 1 is now pushed relative to the cabinet part 2 in the direction indicated by the arrow A in such a manner that the section 22 of the expansion dowel 4 comes to lie in the slot 7 whose width is equal to or slightly greater than the diameter of the section 22 but in any event smaller than the diameter of the head 15 which rests against the edge surfaces 10 and 11 after the introduction of the section 22 into the slot 7, so that with the displacement of the cabinet part 1 in the direction indicated by the arrow A, the expansion bolt 13 is pulled by its head 15 sliding on the edge surfaces 10 and 11 increasingly in the direction indicated by the arrow B out of the borehole 20 whereby the expansion cone 14 effects an expanding and anchoring of the expansion dowel 4 at its end which is provided with a barbed profile 24.

The expansion dowel 4 in this connection has its front surface 23 or its edge 21 resting against the bottom surface 25 of a recess 26 which surrounds the slot 7, the bottom surface 25 in the same manner as the edge surfaces 10 and 11, being at an increasing distance — increasing from the front side 9 to the bottom surface 8 — from the surface side of the cabinet part 2 or from the flattened region 6 of the circumferential wall of the holding piece 3, this increase in distance being less in the case of the bottom surface 25 than in the case of the edge surfaces 10 and 11 so that upon the displacement of the cabinet part 1 during the connecting of the two cabinet parts, there is obtained, in addition to the above-described expansion of the expansion dowel 4, at the same time also, due to the increasing distance of the bottom surface 25 from the cabinet part part 2, a firm pressing of the front surface 1' of the cabinet part 1 and of the flattened region 6 of the holding piece 3 against the cabinet part 2. The connecting of the cabinet parts 1 and 2 is concluded when the fitting parts assume the position shown in FIG. 4, in which the section 22 rests against the closed end of the slot 7 adjacent the bottom surface 8 and the edge 21 rests against the corresponding end of the recess 26, so that forces acting in the direction of the arrow A which are to be transmitted from the cabinet part 1 to the cabinet part 2 are transmitted from the holding piece 3 directly to the section 22 and the edge 21 respectively, whereby the expansion bolt 13 is completely relieved of such forces.

In the case of the modified embodiments shown in FIGS. 5 to 19, the connecting of the two cabinet parts 1 and 2 is effected by a fitting which consists of a holding piece 103 and of an expansion dowel 104 which serves as connecting piece. The holding piece 103 is of cup shape with an inner recess 105 and has a partially cylindrical circumferential surface 103' which has a flattened region 106 which serves as resting surface and with which the holding piece 103 rests against the one surface side of the cabinet part 2 when the cabinet parts 1 and 2 are fastened. In this flattened region 106 there is provided in the wall of the holding piece 103 a slot 107 which passes through the wall and extends perpendicular to the surface sides of the cabinet part 1 and in the direction of the axis of symmetry S of the holding piece 103 respectively, said slot being open towards the front side 109 facing away from the bottom surface 108 of the cup-shaped holding piece 103 and its edge surfaces 110 and 111 forming oblique planes in the recess of the holding piece in the manner that the distance of said edge surfaces 110 and 111 from the outer surface of the holding piece 103 and from the flattened region 106, respectively continuously increases in a direction extending from the open end of the slot 107 to the closed end of said slot lying in the region of the bottom surface 108. The expansion dowel 104 has a longitudinal bore 112 in which an expansion bolt 113 is displaceably arranged, the said bolt having an expansion cone 114 at one end and a head piece 115 of increased cross section at the other end. To this extent, the fitting shown in FIGS. 5 to 19 corresponds to the fitting of FIGS. 1 to 4.

The head piece 115 has the shape of a cylindrical section, and, for the penetrating of the region of the expansion bolt 113 lying between the head piece 115 and the expansion cone 114 into the longitudinal bore 112 of th expansion dowel 104, the said expansion dowel has a slot which is open towards the outer circumference of the expansion dowel 104 and futhermore extends into the longitudinal bore 112.

On the bottom surface 108 of the holding piece 103 there is provided a rectangular opening 116 whose long sides extend parallel to the region 106 and whose length is greater than the diameter of the substantially circular or frustoconical recess 105 of the holding piece 103. The opening 116 is obtained, upon the production of the holding piece which preferably consists of plastic, by the use of a mold with which two grooves 117 and 118 are produced on the inner wall of the holding piece 103 in the region of the recess 105, said grooves being laterally open towards the bottom surface 108 but closed towards the front side 109 of the holding piece 103.

The grooves 117 and 118 which are each 90° from the slot 107 on the circumference of the holding piece 103 and extend also in the direction of the axis of symmetry S form undercut surfaces 119 for detent projections 120 and 121 on a cover cap 122. The cover cap 122 consists essentially of a plate shaped or disk shaped part 123 whose diameter corresponds approximately to the diameter of the recess 105 in the region of the front side 109 and on the one surface side of which there is provided a slot 124 for the engagement of a tool (not shown) for instance a screwdriver or a coin, while on the other surface side of the disk shaped part 123, shifted 180° on the circumference of the part 123, spring tongues 125 and 126 extending perpendicular to said surface side are formed, said tongues bearing the detent projections 120 and 121 respectively on their free ends. On this same surface side, the cover cap 122 and the disk-shaped part 123 have two extensions 127 and 128 respectively extending perpendicular to said surface side, the said extensions being each shifted 90° with respect to the tongues 125 and 126 respectively on the circumference of the disk-shaped part 123.

Figure 5:
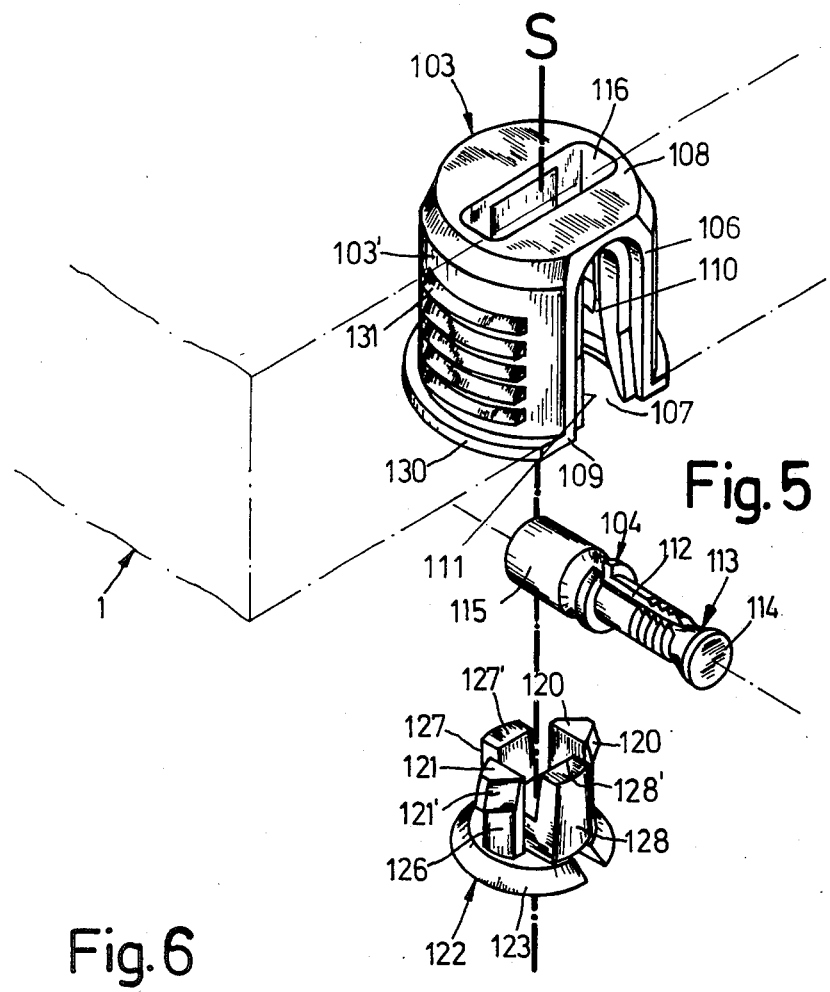
FIG. 5 is an exploded perspective view of another embodiment of the fitting of the invention together with a cabinet part indicated in dashed lines and a cover cap for the holding piece.
Figure 6:
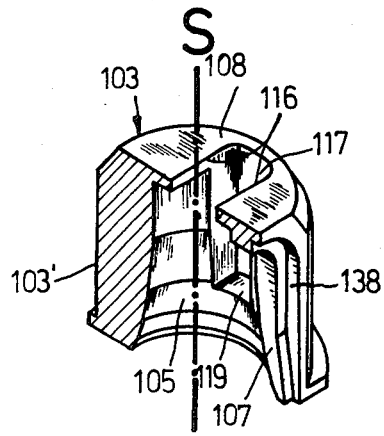
FIG. 6 shows in perspective a cross section through the holding piece of the fitting of FIG. 5.
Figure 7:
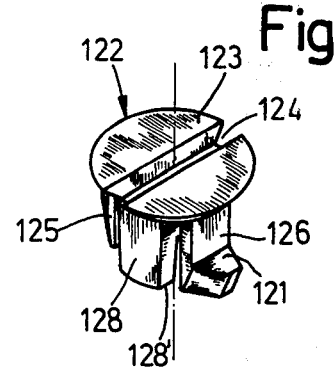
FIG. 7 shows in an individual perspective view the cover cap of the fitting of FIG. 5.

As shown in FIGS. 8 and 9, the fastening of the two cabinet parts 1 and 2 to each other is effected by the fitting shown in FIGS. 5 to 19 fundamentally in the same manner as has been described in connection with FIGS. 1 to 4, the holding piece 103 being anchored in the bore 129 of the cabinet part 1 by barb-like ribs 131 developed on the circumferential surface 103 which dig into the material of the cabinet part, the edge 130 of said ribs which protrudes on the front side 109 resting against the bottom side 1" of the cabinet part 1. The expansion dowel 104 extends into the bore 132 of the cabinet part 2 and its laterally protruding edge 133 which is formed on the side of the expansion dowel 104 facing the head piece 115 rests against the surface side of the cabinet part 2. The expansion dowel 104 is furthermore provided on its end facing away from the expansion cone 114 with a cylindrical section 134 of reduced cross section which extends from the edge 133 to the head piece 115 and sees to it that the head piece 115, when the expansion dowel 4 is introduced in the bore 132, always is at a sufficient distance from the surface side of the cabinet part 2 or from the edge 133 so that the holding piece 103 can be pushed onto the expansion dowel 104 or onto the expansion bolt 113 conveniently in the direction of the arrow A in the manner described above (FIG. 8). Upon this pushing-on, due to the head piece which slides on the edge surfaces 110 and 111 the expansion bolt is pulled increasingly out of the borehole 132 in the direction indicated by the arrow B and it effects, by the expansion cone 114, an expansion of the expansion dowel 104 on the circumferential section thereof provided with the barbed profile 135. Since the expansion dowel 104, via its edge 133 or via a front surface 136 of the edge 133 which faces the section 134 rests against the bottom surface 137 of a recess 138 surrounding the slot 107 and this bottom surface 137, in the same manner as the edge surfaces 110 and 111 is at an increasing distance, from the front side 109 to the bottom surface 108, from the surface side of the cabinet part 2, but this increase in distance in the case of the bottom surface 137 is less than in the case of the edge surfaces 110 and 111, we have the result that upon the displacement of the cabinet part 1 in the direction indicated by the arrow A there is obtained not only the expansion of the expansion dowel 104 but at the same time also a firm pressing of the front surface 1' of the cabinet part 1 against the adjacent surface side of the cabinet part 2. As soon as the section 134 rests against the closed end of the slot 107 which ia adjacent the bottom surface 108, the connecting of the cabinet parts 1 and 2 is temporarily concluded, the cabinet parts assuming the position relative to each other which is shown in FIG. 5. Thereupon, the cover cap 122 is pushed with its tongues 125 and 126 or the extensions 127 and 128 in front into the recess 105 of the holding piece 103 from the visible front side 109 in such a manner that the detent projections 120 and 121 come to lie or engage behind the undercut surfaces 119, whereby the cover cap 122 is anchored in the recess 105 (FIG. 10).

One of the extensions 127 or 128 lies in this connection in the recess 105 of the holding piece 103 adjacent the slot 107 and its free end 127' or 128' extends to the circumferential surface of the head piece 115, whereby the head piece 115 is secured against undesired sliding out of the recess 105 of the holding piece 103 and the cabinet parts 1 and 2 are thereby also secured against unintentional loosening by the shifting of the cabinet part 1 in the direction opposite the arrow A. By the symmetrical developement of the cover cap 122 with reference to the tongues 125 and 126 as well as with reference to the extensions 127 and 128, the result is obtained that this cover cap 122, both in the position shown in FIG. 5 and in a position turned 180° around the axis of symmetry S can be inserted in the recess 105 of the holding piece 103, as a result of which the fastening of the cover cap 122 is substantially facilitated. For loosening the connection between the cabinet parts 1 and 2 the cover cap 122 is first turned by means of the tool engaged in the slot 124, whereby the detent projections 120 and 121, due to their triangular development or due to their lateral oblique surfaces 120' and 121', slide out from the grooves 118 and 119 with the elastic deflection of the tongues 125 and 126 so that the cover cap 122 can be removed without difficulty from the holding piece 103 at least when one of the detent projections 120 and 121 is in the slot 107 and the two spring tongues 125 and 126 are completely relaxed. The cover cap 122 then falls downward out of the holding piece 103. The complete loosening of the two cabinet parts 1 and 2 is then effected by displacing the cabinet part 1 in the direction opposite the arrow A.

FIGS. 20 to 25 show a modification of the fitting of FIGS. 5 to 19 in which modification the securing of the head piece 115 in the recess 105 is not effected by means of the cover cap 122 but by means of a spring tongue 139 which is developed on the bottom surface 108 and extends in the recess 105 in the direction of the axis of symmetry S. This tongue is provided at the free end thereof adjacent the front surface 109 with a detent projection 140 for the head piece 115 and it is so widened in wedge shape in the direction towards the slot 107 on this free end for the formation of the detent projections 140 that the distance between the surface side of the detent projection 140 which faces the slot 107 from the slot 107 continuously decreases in the direction towards the bottom 108 of the holding piece 103. The detent projection 140 forms, approximately in the central region of the tongue 139, a detent surface 141 which extends perpendicular to the axis of symmetry S and has a trough-shaped depression 142 for the head piece 115.

Figure 25:
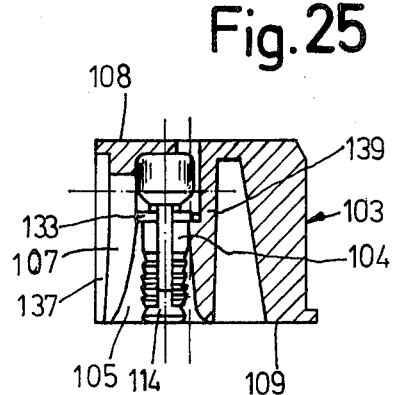
FIG. 25 is a section through the holding piece of the fitting in accordance with FIG. 20 with the connecting piece arranged in the holding piece.

The attaching of the cabinet parts 1 and 2 is effected in the same manner with this fitting shown in FIGS. 20 to 25 as has been described in connection with FIGS. 1 to 4, and at the end of the connecting together of the cabinet parts 1 and 2 the head piece 115 engages on the detent projection 140 with elastic bending away of the tongue 139 behind the undercut or detent surface 141. For the detaching of the cabinet parts 1 and 2, the tongue 139 is bent away from the cabinet part 2 by a suitable tool so that the head piece 115 is released from the detent projection 140 and the cabinet part 1 can be removed, together with the holding piece 103, from the expansion dowel 104. As shown in FIG. 25, this embodiment which is shown in FIGS. 20 to 25 furthermore has the advantage that, for the transportation of the fitting, for instance, from the fitting manufacturer to the cabinet manufacturer, the expansion dowel 104 together with the expansion bolt 113 can be arranged in the recess 105 of the holding piece 103, namely in the region between the slot 107 and the surface side of the tongue 139 facing said slot, the head piece 115 lying adjacent the bottom surface 108 and the detent surface 141 engaging behind the edge 133 of the expansion dowel 104 and holding said expansion dowel fast in the recess 105.

Figure 26:
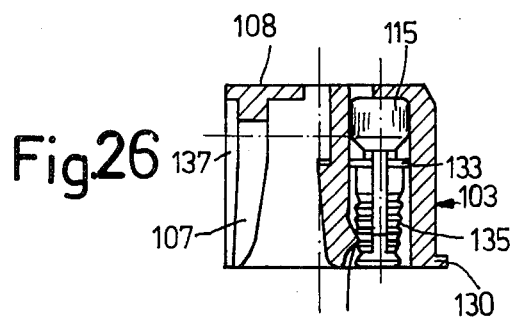
FIG. 26 is a showing similar to FIG. 25 but in the case of another embodiment.

FIG. 26 shows a modification in the manner that a nose-shaped projection 143 is provided on the free end of the tongue 139, namely on the surface side of the tongue facing away from the slot 107, which projection holds the barbed profile 135 of the expansion dowel 104 fast in the recess 105 upon the transportation of the fitting.

The length of the expansion dowel 104 which is provided with the expansion bolt 113 corresponds to the depth of the recess 105, so that neither the expansion dowel 104 nor the expansion bolt 113 protrudes beyond the holding piece 103 in the region of the front side 109.

Figure 27:
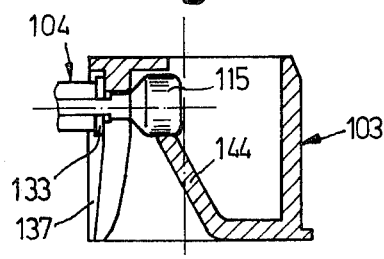
FIG. 27 is a section through the holding piece of another embodiment of the fitting of the invention together with the corresponding connecting piece.
Figure 28:
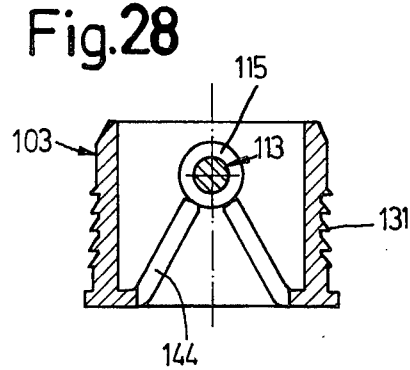
FIG. 28 is a section along the line VII-VII of FIG. 27.

FIGS. 27 and 28 show an embodiment of the fitting of the invention in which the holding piece 103 has a tab 144 which is developed on the front side 109 and extends obliquely into the inside of the recess 105 in order to secure the head piece 115 in the recess 105, said tab being first of all bent away to the side by the head piece 115 upon the connecting of the cabinet parts 1 and 2 and the head piece then engaging behind it so that the unintentional loosening of the cabinet parts 1 and 2 is no longer possible. Only by bending the tab 144 in the direction towards the side of the holding piece 103 which faces away from the cabinet part 2 does the head piece 115 again come free so that the cabinet parts 1 and 2 can be separated from each other.

While the expansion dowel 4 or 104 as well as the holding piece 3 or 103 and possibly the cover cap 122 or tongue 39 or the tab 144 are preferably made of plastic, the expansion bolt 13 or 113 consists of metal.

The invention has been described above with reference to illustrative embodiments. It is self-evident that modifications thereof are possible without going beyond the inventive concept.

What is claimed is:

1. A furniture fitting for detachable connection of first and second furniture components through abutting surfaces of said components, said fitting comprising:
   (a) an expansion dowel operable for insertion in a bore hole in a first of said furniture components along an axis perpendicular to the abutting surface of said first component, said dowel having a displaceable expansion bolt, one end of said bolt defining an engagement surface and an expandable portion disposed about said bolt, said expandable portions having dimensions such as to permit insertion in an unexpanded state in said bore hole and being expandable for anchoring in said bore hole upon axial displacement of said expansion bolt in the direction of the engagement surface end, and
   (b) a holding piece operable for insertion along an axis parallel to the abutting surface of the second of said furniture components in a recess in said second component communicating with said abutting surface, said holding piece having a base portion and a side wall portion with a slot being defined on said side wall portion, the internal edge portions of said slot having obliquely sloping surfaces operable to engage said engagement end of said bolt and, upon sliding movement of said abutting furniture surfaces, to displace said bolt relative to said expandable portion and thereby expand said expandable portion as said bolt follows said obliquely sloping surfaces.

2. A furniture fitting according to claim 1 wherein said bolt has a central portion and first and second end portions, said first end portion defining a conical section of increasing diameter, and said second end portion defining an engagement head carrying said engagement surface, said expandable portion being disposed about said central 3. A fitting according to claim 2 wherein the width of the slot is narrower than the cross section width of said bolt engagement head and said slot communicating with the open end of said cup-like holding piece for introduction of said head.

4. A fitting according to claim 3 wherein the distance from the surface of said internal edge portions to the outside surface of said holding piece increases continuously in direction away from the open end of said holding piece.

5. A fitting according to claim 4 wherein the outside surface of said holding piece is provided with a flattened face operable to lie coplanar with the abutting surface of said second furniture component when said holding piece is disposed in said recess, said slot being defined in said flattened face.

6. A furniture fitting according to claim 5 wherein said flattened face of said holding piece is provided with a channel about a portion of said slot, said channel having substantially parallel side walls disposed from one another at a distance equal to or greater than the diameter of the deformable expansion member and an inner wall sloping obliquely away from said face in the same direction as but at a lesser angle than said internal edge portions.

7. A fitting according to claim 6 wherein said expansion dowel is provided with a laterally protruding edge behind said head which edge rests on one side against the abutting surface side of said first component and rests on its other side in said channel of said holding piece.

8. A furniture fitting according to claim 2 wherein said central portion of said bolt is provided with an area of reduced cross section anterior to said head, and said slot is of a width sufficient to admit said reduced cross section area.

9. A fitting according to claim 2 including means operable to lock said engagement head in said holding piece with said bolt being axially displaced relative to said expandable portion.

10. A fitting according to claim 9 wherein a spring detent projection is disposed in the inside of said holding piece for engagement of said axially displaced bolt head.

11. A fitting according to claim 10 wherein said detent projection is provided on one end of a tongue adjacent to the open end of the slot and formed on the bottom of the cup-shaped holding piece extending into the path of said head of said expansion bolt in said slot.

12. a fitting according to claim 11 wherein said tongue widens in wedge or cone-shaped manner in one section from its free end towards the bottom of said holding piece and an undercut surface operable to receive and retain said head end of said expansion bolt is defined in said section.

13. A fitting according to claim 11 wherein a nose-shaped projection is provided on said tongue operable to clamp said expansion dowel when in condition of non-use.

14. A fitting according to claim 10 wherein said detent projection and the inner wall of said holding piece most distant from said slot when in condition of non-use define a space operable to receive said expansion dowel with its longitudinal axis lying parallel to the axis of symmetry of said cup-shaped holding piece.

15. A fitting according to claim 9 wherein at least one elastic lug extends obliquely into the inside of said holding piece from that side of the open end most distant from said slot.

16. A fitting according to claim 9 wherein said holding piece includes a cover cap operable for insertion in said holding piece, said cap having at least one locking extension operable to lock said engagement head in said holding piece.

17. A fitting according to claim 16 wherein said cover cap comprises a circular plate within said locking extension extending perpendicularly from a surface side thereof.

18. A fitting according to claim 17 wherein elastic detent projections are defined on said plate, said projections being operable to engage undercut surfaces of said holding piece when said cover cap is inserted in said holding piece.

19. A fitting according to claim 18 wherein said detent projections are of a triangular cross section in a plane parallel to the surface sides of said plate.

20. A fitting according to claim 1 wherein said holding piece and said expandable portion of said expansion dowel are plastic.

21. A fitting according to claim 1 wherein said expansion bolt is metal.

* * * * *